Dec. 16, 1969       D. MacINTYRE ET AL       3,483,929
                      SOIL SHAPING ROTOR

Filed March 7, 1966                    2 Sheets-Sheet 1

INVENTORS
DUNCAN MACINTYRE
IAN M. ROBERTSON

BY  Larson and Taylor

ATTORNEYS

3,483,929
SOIL SHAPING ROTOR

Duncan MacIntyre, Currie, Midlothian, and Ian MacPherson Robertson, Edinburgh, Scotland, assignors to National Research Development Corporation, London, England, a British corporation
Filed Mar. 7, 1966, Ser. No. 532,197
Claims priority, application Great Britain, Mar. 11, 1965, 10,343/65
Int. Cl. A01b *9/00, 49/02, 33/16*
U.S. Cl. 172—63                           13 Claims

ABSTRACT OF THE DISCLOSURE

A soil-working implement to form and trim a raised soil bed. A central soil engaging member is mounted between two helically-bladed end members, the latter being shaped to force soil inwardly towards the central member and the central member arranged to work on soil between the two end members in order to produce a substantially flat-topped raised bed.

---

This invention relates to soil-working implements for use in agriculture, horticulture and like purposes requiring the contouring of soil.

Rotary soil-work implements can be used for various purposes, for example in rotary disc ploughs for preparing root crops for harvesting, and in rotary cultivators either as rotary pronged members or as spiral tillers in which soil-engaging blades are arranged rather like the helical blades of a cylinder type lawn mower. These rotary cultivators cut into the earth and till the earth but do not produce any furrows.

One requirement in agriculture and horticulture is the formation in soil of furrows or of ridges in combination with adjacent substantially flat soil surfaces, and an object of the present invention is the provision of an implement capable of satisfying this requirement.

According to the present invention, a soil-working implement comprises main soil working means mounted for rotation and so formed that when rotated they sweep out a continuous profile or contour, driving means by which these main soil working means can be continuously rotated, auxiliary soil working means arranged adjacent to the main soil working means, mounted for rotation and arranged to work upon a substantially flat soil surface to one side of a ridge or furrow produced by the main soil working means, and driving means by which the auxiliary soil working means can be continuously rotated.

The invention will now be described, by way of example, with reference to the accompanying drawings, in which.

Figure 1:
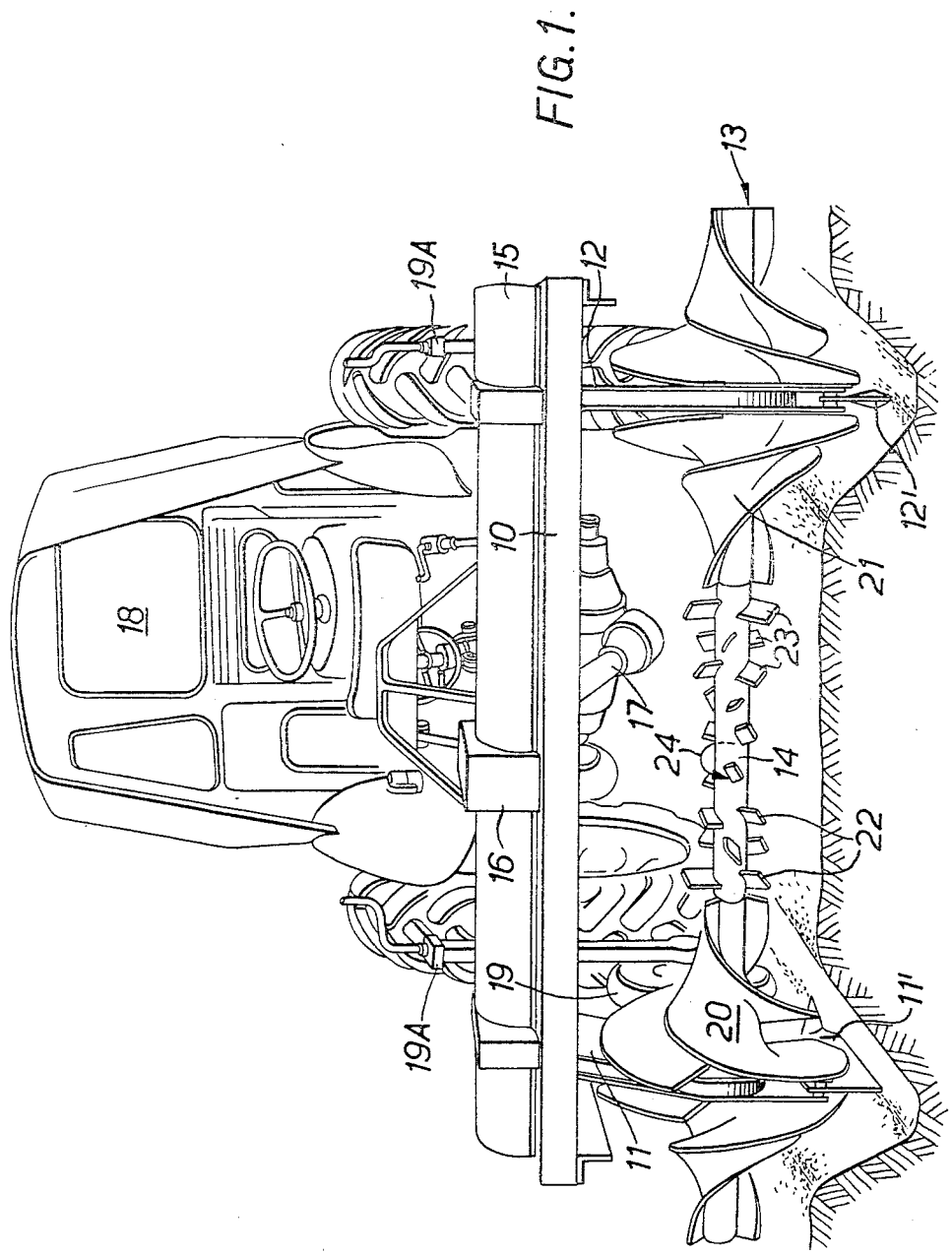
FIGURE 1 is a pictorial view of a tractor drawing a soil working implement.

The soil working implement illustrated is used to produce a raised bed of soil on previously tilled ground, and comprises a frame 10 from which hollow brackets 11 and 12 extend downwardly. These two brackets support bearings which carry a horizontal shaft 14 which, with other members mounted on it form a soil shaper 13. Each of the brackets 11 and 12 houses a vertical drive shaft connecting shaft 14 with a horizontal shaft carried by the frame 10 and enclosed by shielding 15, this horizontal shaft being in turn driven through a gear box 16 by a power take-off shaft 17 which, in orthodox manner, is driven by the propulsion motor of tractor 18. The frame 10 is connected by pivoted tow links to the rear of the tractor so that the frame 10 can move up and down relative to the tractor over a small distance, but cannot slew relative to the tractor. The soil working implement is supported on two supporting wheels 19 which are such a distance apart that they run in the tracks of the main tractor wheels, and each such wheel is provided with a screw adjustment device 19A by which the position of the wheel relative to the frame can be vertically adjusted. The brackets 11 and 12 have mounted on them rigid plough members 11' and 12' respectively. It will be noted that each tractor wheel is aligned with one of the supporting wheels 19 and with one of the ploughs 11' and 12'.

The soil shaper 13 includes a central part formed by the central part of the shaft 14 and by a multiplicity of blades arranged in two sets 22 and 23 on the outside of the shaft 14. Over each half of the length of the central part, the set of blades 22 or 23 together form part of a three-start interrupted screw thread. Four rotors are mounted on the shaft 14, at each end of the shaft there being provided two of these rotors, positioned respectively on opposite sides of the bracket 11 or 12. Thus the two inner rotors are designated rotors 20 and 21. Each rotor is in the form of a three-start helically bladed body secured to the shaft 14 to rotate therewith, the pitch of the rotor turns increasing away from the associated bracket 11 or 12, and the radial depth of the rotor decreasing away from that bracket. The rotors inboard of the brackets 11 and 12 are of opposite hands, and at each end of the shaft 14 the two rotors are of opposite hands. The shaft 14 is driven by the tractor motor so that over each half of the length of the shaft the rotors and the blades 23 tend to move soil away from the associated brackets 11 or 12.

Figure 2:
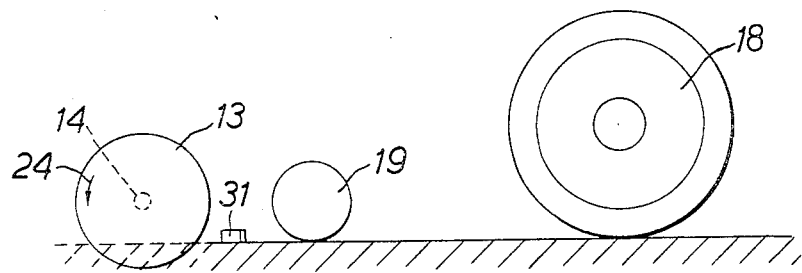
FIGURE 2 is a diagram illustrating the provision of share means in front of rotors of the soil-working implement.

As shown diagrammatically in FIGURE 2, a rigid elementary straight-edged share 31 is provided in front of each of the rotors to take the immediate shock of meeting with stones, hard patches, or other obstructions.

In use of the soil working implement, the wheels 19 are vertically adjusted, relative to the frame 10, by means of the screw adjustment devices 19A to bring the shaft 14 a desired distance above the level of the ground engaged by the wheels. With the implement properly attached to the tractor, the power-take-off of the tractor is energised and the shaft 14 is driven at a suitable speed, say 100 revolutions per minute, by the tractor engine, in the direction indicated by the arrow 24. As the tractor moves forwardly, towing the implement, the ploughs 11' and 12' enter the soil and the lower parts of the rotors also entering the soil. As mentioned above, the implement is used on previously tilled ground, and thus the two inner rotors are able to urge displaced soil inwardly towards the middle of the shaper to produce, between the rotors, a raised bed of soil. The blades 22 and 23 work on the soil displaced inwardly by these two inner rotors, and spread it evenly so that the top of the raised bed has an acceptable degree of levelness.

The outer pair of rotors serve to displace earth outwardly from the implement, so forming at each side of the bed a furrow. This furrow serves to guide the tractor and the implement during the forming of the next adjacent raised bed, and since there is an outer rotor on each side of the implement the implement can be operated in both directions across a field to form a succession of such raised beds. During the return trip, one of the outer rotors is effective to trim the shape of the side of the raised bed already formed in the previous transit of the implement.

In use of the implement, the speed at which the shaft 14 is driven is determined by the speed of the tractor propulsion motor, and therefore is related to the speed of the tractor over the ground. It therefore is convenient to include in the driving means for shaft 14 some form of gear box by which the shaft speed can be adjusted independently of the tractor road speed. The rotor speed of 100 revolutions per minute mentioned above was found satisfactory in shaping a raised bed of about nine inches height. The proper speed will depend also upon the nature and the condition of the soil, and these conditions will also determine the proper forward speed for the towing tractor.

The implement described above enable the rapid formation in tilled soil of a flat-topped raised bed for seeding or other purposes. Such a raised bed can be used instead of a series of narrow ridges. The technique of ridging was developed so that the soil can be built up to a depth suitable for particular crops, and weed control, which includes hand hoeing, can be carried out along the confines of the ridge. With the development of chemical weed control, the need for a series of narrow ridges to facilitate weeding is not so great, and a raised bed is advantageous. Although such a raised bed can be formed with an angle dozer, there are disadvantages in the use of such a machine, arising mainly from the irregularity of the top of the bed so formed.

The invention is not restricted in its application to implements, such as that described above, which produce a raised bed of soil. Thus the auxiliary soil-working means can be arranged to extend away from the main soil-work means on the side thereof having the greater diameter, and the implement can then be used to maintain the side of a ridge and at the same time clear out weeds from a "walk" between two such ridges. Such an arrangement finds use in hop fields, in which plants are rooted in ridges which are widely separated by "walks." For this use, the shaft 14 will be replaced with a member having tines, prongs or blades of length sufficient to engage the surface of a "walk" between adjacent ridges. In order that the auxiliary soil-working means may be of reasonably small diameter, in such an instance it will usually be more convenient to use a separate shaft carrying these soil-working members, having its axis below the axis of shaft 14. Such an additional shaft will be arranged after the rotors forming the main soil-working means, so that it also acts upon soil moved in its direction by the rotors.

The shape of the main soil-working means is suited to the form of the edge of the bed required to be formed, or to be maintained. It will be seen that the rotating main soil-working means when rotated sweep out a continuous profile or countour, and it is this which must be suited to the ridge or furrow to be maintained. The size of the main soil-working means will depend again upon the ridge or furrow required, and for the irrigation ditch between two asparagus beds would be up to eighteen inches radius.

Multi-start helical blading has been found effective for the main soil-working means, and usually the best results will be obtained with the lower part of the blading moving through the soil in the same direction as that in which the implement is travelling.

Figure 3:
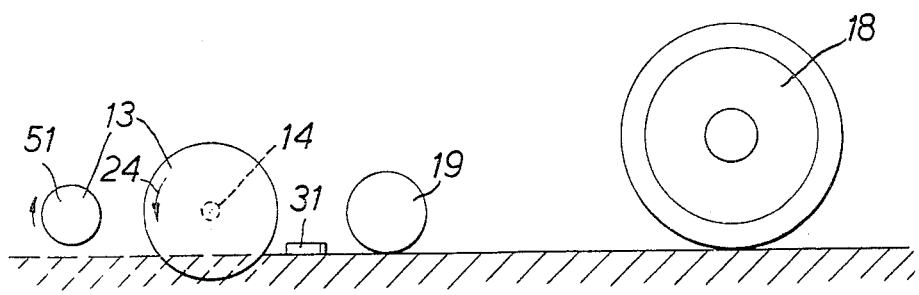
FIGURE 3 is a diagram illustrating an alternative arrangement of auxiliary soil-working means shown in FIGURE 1.

The main soil-working means and the auxiliary soil-working means need not be arranged to rotate about a common axis, or at the same speed, or even in the same direction. Thus FIGURE 3 illustrates diagrammatically an arrangement in which the auxiliary soil-working means is in the form of a bladed horizontal shaft 51, the height of which is independently variable, which is disposed behind the rotor shaft 14, is driven at a greater speed than the shaft 14 and is rotated in the reverse direction.

The sets of blades 22 and 23 can be modified to suit the operation they are required to perform, such as levelling, or cultivation. Thus the shapes, the inclination, the number and the distribution of these blades can be selected to suit the required function.

The implement described and shown includes basically two rotors forming the sides of the raised bed and a central section or part forming the level top of the bed. In other forms of the implement, a long shaft or separate shafts can be used to form two or more such raised beds in one transit of the implement, subject to the power required being within the capabilities of the tractor or within the power provided by an auxiliary engine carried, for example, by the implement.

The main soil-working means, when used to produce a ridge, can be associated with an additional auxiliary member of suitable form arranged to feed additional soil to the main soil-working means for incorporation into the ridge being formed.

The soil-working implement has been described as a separate entity, but if desired it can form part of a larger implement or machine, or can be used in conjunction with other implements, so that seeding, planting or distribution of fertiliser, can be carrier out in one transit of the machine so that, for instance, the whole of a bed-forming and seeding (or planting) and/or fertilising operation could be carried out in the one transit.

We claim:

1. A soil-working implement for use in forming and trimming a raised soil bed and including a frame, at least one rotatable central soil-engaging member and at least two rotatable helically-bladed soil-engaging end members mounted on the frame, the said two end members each including means for moving the soil sidewardly and upwardly, relative to the direction of travel of the implement to form one edge of a raised soil bed, which is raised relative to the level of the ground prior to engagement by the implement, and wherein said central soil-engaging member includes means for engaging and working the raised soil bed.

2. A soil-working implement according to claim 1 in which gauge wheel means carried by the frame are arranged to engage the soil forwardly of the implement, thereby to determine the depth of penetration of the end members into the soil.

3. A soil-working implement according to claim 1 in which the central soil engaging member is in the form of soil levelling blades mounted on a rotatable shaft.

4. A soil-working implement according to claim 1 in which the central soil engaging member is in the form of cultivating members mounted on a rotatable shaft.

5. A soil-working implement according to claim 1 in which the central soil engaging member and the end soil engaging members are arranged to rotate about parallel axes.

6. A soil-working implement for use in forming and trimming a raised soil bed and including a frame having mounted thereon at least one central soil-engaging member and at least two helically-bladed soil engaging end members of radius diminishing in the inward direction the end members being shaped to force soil inwardly and said central member being adapted to engage and work the soil between said two end members, whereby in use a substantially flat-topped raised bed with shaped sides may be prepared.

7. A soil-working implement as claimed in claim 6, wherein means is provided for engaging obstructions immediately in the path of each said end member.

8. A soil-working implement according to claim 6 wherein said central member and said end members are arranged to rotate about a substantially common axis.

9. A soil-working implement according to claim 6, in which each helically-bladed end member has a pitch between convolutions which increases progressively from one axial zone to another axial zone thereof.

10. A soil-working implement according to claim 6 in which each helically bladed end member is multibladed.

11. A soil-working implement according to claim 6 therefore, including a gauge wheel means comprising two wheels carried by the frame at positions spaced apart across the width of the implement, whereby in use these wheels are effective to maintain a transverse axis of the implement substantially parallel to the soil surface, and the axis about which the end members are mounted for rotation is substantially parallel to the said implement axis.

12. A soil-working implement according to claim 6 in which the central soil engaging members are arranged on the same shaft as the end soil engaging members.

13. A soil-working implement according to claim 6 in which the end soil engaging members are arranged to move soil inwardly from both sides to form a ridge of soil and the central soil engaging member is arranged to level the top of this ridge.

References Cited

UNITED STATES PATENTS

| | | | |
|---|---|---|---|
| 2,627,681 | 2/1953 | Diotti | 37—82 |
| 3,328,902 | 7/1967 | Hanson | 37—81 |
| 2,205,752 | 6/1940 | Silver | 172—63 |
| 2,299,334 | 10/1942 | Matter | 172—532 |
| 2,410,003 | 10/1946 | Bagan | 172—119 |
| 2,753,782 | 7/1956 | Chattin | 172—121 X |

FOREIGN PATENTS 8,658    3/1960    Japan.

ROBERT E. PULFREY, Primary Examiner

W. J. CONLON, Assistant Examiner

U.S. Cl. X.R.

37—81; 172—42, 121